(12) United States Patent
Dhatchinamoorthy et al.

(10) Patent No.: US 12,366,994 B2
(45) Date of Patent: Jul. 22, 2025

(54) MULTIPATH INITIATOR FOR DATA STORAGE DEVICE ARRAYS

(71) Applicant: WESTERN DIGITAL TECHNOLOGIES, INC., San Jose, CA (US)

(72) Inventors: Rahul Gandhi Dhatchinamoorthy, Bangalore (IN); Kumar Ranjan, Bangalore (IN); Senthil Kumar Veluswamy, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/365,025

(22) Filed: Aug. 3, 2023

(65) Prior Publication Data

US 2024/0427524 A1 Dec. 26, 2024

Related U.S. Application Data

(60) Provisional application No. 63/510,045, filed on Jun. 23, 2023.

(51) Int. Cl.
*G06F 3/06* (2006.01)

(52) U.S. Cl.
CPC .......... *G06F 3/0659* (2013.01); *G06F 3/0635* (2013.01); *G06F 3/0679* (2013.01); *G06F 3/0604* (2013.01)

(58) Field of Classification Search
CPC .... G06F 3/0659; G06F 3/0635; G06F 3/0679; G06F 3/0604; G06F 3/061; G06F 3/067
USPC ....................................................... 711/154
See application file for complete search history.

(56) References Cited

U.S. PATENT DOCUMENTS

| | | | |
|---|---|---|---|
| 11,100,024 B2 | 8/2021 | Olarig et al. | |
| 11,366,771 B2* | 6/2022 | Smith | G06F 11/3034 |
| 11,567,883 B2* | 1/2023 | Veluswamy | G06F 9/5016 |

* cited by examiner

*Primary Examiner* — Hua J Song
(74) *Attorney, Agent, or Firm* — Patent Works LLP

(57) ABSTRACT

Systems, methods, and a multipath initiator for a data storage device array that presents a single path host interface are described. The multipath initiator includes at least two backend paths to multiport data storage devices and a single path host interface. The initiator may determine a queue pair identifier for a host connection and storage commands to that host connection. The initiator may assign a path identifier, such as for a first backend path or a second backend path, to use for storage commands and send the storage commands to the data storage devices using the selected backend path.

20 Claims, 9 Drawing Sheets

MULTIPATH INITIATOR FOR DATA STORAGE DEVICE ARRAYS

TECHNICAL FIELD

The present disclosure generally relates to storage systems using multipath configurations for connecting to data storage devices and, more particularly, to an initiator that manages backend multipath connections without the host system being configured for multipath connections.

BACKGROUND

Multi-device storage systems utilize multiple discrete data storage devices, generally disk drives (solid-state drives (SSD), hard disk drives (HDD), hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

There is an emerging trend in the storage industry to deploy disaggregated storage. Disaggregated storage brings significant cost savings via decoupling compute and storage node life cycles and allowing different nodes or subsystems to have different compute to storage ratios. In addition, disaggregated storage allows significant flexibility in migrating compute jobs from one physical server to another for availability and load balancing purposes.

Disaggregated storage has been implemented using a number of system architectures, including the passive Just-a-Bunch-of-Disks (JBOD) or Just-a-Bunch-of-Flash (JBOF) architecture, the traditional All-Flash Array (AFA) architecture, and Ethernet Attached Bunch of Flash (EBOF) disaggregated storage, which typically uses specialized chips to translate commands from external NVMe-oF (Non-Volatile Memory Express over Fabrics) protocol to internal NVMe (NVM Express) protocol. These architectures may be configured to support various Quality of Service (QOS) metrics and requirements to support host applications, often supporting a plurality of host systems with different workload requirements.

In some architectures, various schemes for supporting multiple physical paths in NVMe and/or NVMe-OF storage systems have been implemented. Determining the availability of and managing multiple paths from the host system to the data storage devices has previously relied on the host system to be configured for multiple host connections reflecting the different paths to the storage devices. This may require additional host overhead and/or configuration to support multiport data storage devices. For example, multipath software, such as device mapper and the native multipath functions in the NVMe standards, may be available as separate application packages that add overhead to the central processing unit (CPU)/kernel in large-scale environments. The multipath software sits on top of a block device to continuously monitor and select the best possible way to route the user data to the target data storage device. While a multipath layer may provide the capability of managing paths and handling failure, it also increases challenges in installing and configuring the application on multiple host platforms.

Therefore, there still exists a need for storage systems that offload multipath management for multiport data storage devices to the enclosure-level, such embedding the functionality in an NVMe initiator card with multiple switched paths to the data storage devices.

SUMMARY

Various aspects for multipath initiators in data storage device arrays are described. More particularly, multipath management and routing may be implemented in the initiator based on dynamically mapping queue pair identifiers from host connections to backend path identifiers.

One general aspect includes a system including: a processor; a memory; a storage interface configured to communicate with a plurality of data storage devices, where the storage interface may include a first backend path to a first storage device port of each data storage device of the plurality of data storage devices, and a second backend path to a second storage device port of each data storage device of the plurality of data storage devices; a host interface configured to communicate with at least one host device; and an interface controller. The interface controller is configured to: determine, for a first storage connection request from a host device, a first queue pair identifier assigned to a target data storage device in the plurality of data storage devices; determine, for a first storage command to the first queue pair identifier, a first path identifier for a first selected backend path selected from the first backend path and the second backend path; and send the first storage command to the target data storage device through the first selected backend path.

Implementations may include one or more of the following features. The interface controller may be further configured to: determine, for a second storage command to the first queue pair identifier, a second path identifier for a second selected backend path selected from the first backend path and the second backend path; and send the second storage command to the target data storage device through the second selected backend path. The first selected backend path may be the first backend path and the second selected backend path may be the second backend path. The interface controller may include a queue pair mapping data structure that includes a plurality of mapping entries; each mapping entry of the plurality of mapping entries may include a queue pair identifier for a corresponding host connection to the plurality of data storage devices and a backend path identifier for that corresponding host connection; the plurality of mapping entries may include a first mapping entry for the first queue pair identifier; and the backend path identifiers may be selected from a first backend path identifier for the first backend path and a second backend path identifier for the second backend path. The interface controller may be further configured to: assign, during a first operating period, the backend path identifier for each mapping entry of the plurality of mapping entries in a first path configuration; and reassign, during a second operating period, the backend path identifier for each mapping entry of the plurality of mapping entries in a second path configuration. A first portion of the plurality of mapping entries may receive the first backend path identifier during the first operating period; a second portion of the plurality of mapping entries may receive the first backend path identifier during the second operating period; and the first portion and the second portion may be different sets of the plurality of mapping entries. The interface controller may be further configured to assign, based on a multipath policy, the backend path identifier for each mapping entry of the plurality of mapping entries; a first portion of the plurality of mapping entries may receive the first backend path identifier; and a second portion of the plurality of mapping entries may receive the second backend path identifier. The multipath policy may distribute the first portion of the plurality of mapping entries alternating with the second portion of the plurality of mapping entries. The multipath policy may distribute the first portion of the plurality of mapping entries randomly among the second portion of the plurality of mapping entries. The interface controller may be further configured to: determine a failure condition for the first backend path; and reassign, responsive to the failure condition, the backend path identifier for each mapping entry with the first backend path identifier to the second backend path identifier. The interface controller may include an administrative queue pair mapping data structure that includes a plurality of administrative mapping entries; each administrative mapping entry of the plurality of administrative mapping entries may include a queue pair identifier for a corresponding host administrative connection to the plurality of data storage devices and a backend path identifier for that corresponding host administrative connection; and the backend path identifiers may be selected from a first backend path identifier for the first backend path and a second backend path identifier for the second backend path. The interface controller may be further configured to: determine usage metrics for the first backend path and the second backend path; compare the usage metrics of the first backend path and the second backend path to determine which backend path is a least used path; and assign, responsive to determination of the least used path, the backend path identifier for at least one administrative mapping entry to the backend path identifier for the least used path. The system may include the plurality of storage devices, the initiator card, the first switch, and the second switch. Each data storage device of the plurality of data storage devices may include: a non-volatile storage medium; the first storage device port configured for connection to the first backend path; and the second storage device port configured for connection to the second backend path. The initiator card may include: the processor; the memory; the storage interface including a first switch port configured for the first backend path and a second switch port configured for the second backend path; the host interface including a host port configured for communication with the at least one host device; and the interface controller. The first switch may be configured for the first backend path between the first switch port and the first storage device ports of the plurality of data storage devices; and a second switch may be configured for the second backend path between the second switch port and the second storage device ports of the plurality of data storage devices.

Another general aspect includes a computer-implemented method including: configuring, from a storage interface initiator, a first backend path to a first storage device port of each data storage device of a plurality of data storage devices; configuring, from the storage interface initiator, a second backend path to a second storage device port of each data storage device of the plurality of data storage devices; determining, for a first storage connection request from a host device, a first queue pair identifier assigned to a target data storage device in the plurality of data storage devices; determining, for a first storage command to the first queue pair identifier, a first path identifier for a first selected backend path selected from the first backend path; and the second backend path; and sending the first storage command to the target data storage device through the first selected backend path.

Implementations may include one or more of the following features. The computer-implemented method may include: determining, for a second storage command to the first queue pair identifier, a second path identifier for a second selected backend path selected from the first backend path and the second backend path; and sending the second storage command to the target data storage device through the second selected backend path, where the first selected backend path is the first backend path and the second selected backend path is the second backend path. The computer-implemented method may include configuring a plurality of mapping entries in a queue pair mapping data structure, where: each mapping entry of the plurality of mapping entries may include a queue pair identifier for a corresponding host connection to the plurality of data storage devices and a backend path identifier for that corresponding host connection; the plurality of mapping entries may include a first mapping entry for the first queue pair identifier; and the backend path identifiers may be selected from a first backend path identifier for the first backend path and a second backend path identifier for the second backend path. The computer-implemented method may include: assigning, during a first operating period, the backend path identifier for each mapping entry of the plurality of mapping entries in a first path configuration; and reassigning, during a second operating period, the backend path identifier for each mapping entry of the plurality of mapping entries in a second path configuration. A first portion of the plurality of mapping entries may receive the first backend path identifier during the first operating period; a second portion of the plurality of mapping entries may receive the first backend path identifier during the second operating period; and the first portion and the second portion may be different sets of the plurality of mapping entries. The computer-implemented method may include assigning, based on a multipath policy, the backend path identifier for each mapping entry of the plurality of mapping entries, where: a first portion of the plurality of mapping entries receive the first backend path identifier; and a second portion of the plurality of mapping entries receive the second backend path identifier. The computer-implemented method may include distributing, based on the multipath policy, the first portion of the plurality of mapping entries alternating with the second portion of the plurality of mapping entries. The computer-implemented method may include distributing, based on the multipath policy, the first portion of the plurality of mapping entries randomly among the second portion of the plurality of mapping entries. The computer-implemented method may include: determining a failure condition for the first backend path; and reassigning, responsive to the failure condition, the backend path identifier for each mapping entry with the first backend path identifier to the second backend path identifier. The computer-implemented method may include configuring a plurality of administrative mapping entries in an administrative queue pair mapping data structure, where: each administrative mapping entry of the plurality of administrative mapping entries may include a queue pair identifier for a corresponding host administrative connection to the plurality of data storage devices and a backend path identifier for that corresponding host administrative connection; and the backend path identifiers are selected from a first backend path identifier for the first backend path and a second backend path identifier for the second backend path. The computer-implemented method may include: determining usage metrics for the first backend path and the second backend path; comparing the usage metrics of the first backend path and the second backend path to determine which backend path is a least used path; and assigning, responsive to determination of the least used path, the backend path identifier for at least one administrative mapping entry to the backend path identifier for the least used path.

Still another general aspect includes a storage system that includes: a processor; a memory; a host interface configured to communicate with at least one host device; a plurality of data storage devices; a storage interface configured to communicate with the plurality of data storage devices, where the storage interface includes a first backend path to a first storage device port of each data storage device of the plurality of data storage devices, and a second backend path to a second storage device port of each data storage device of the plurality of data storage devices; means for determining, for a first storage connection request from a host device, a first queue pair identifier assigned to a target data storage device in the plurality of data storage devices; means for determining, for a first storage command to the first queue pair identifier, a first path identifier for a first selected backend path selected from the first backend path and the second backend path; and means for sending the first storage command to the target data storage device through the first selected backend path.

The various embodiments advantageously apply the teachings of data storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve multipath management and routing for multiport data storage devices, such as by using storage queue identifiers in a storage interface initiator to dynamically map path identifiers for routing storage commands for the same host connection through multiple paths. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
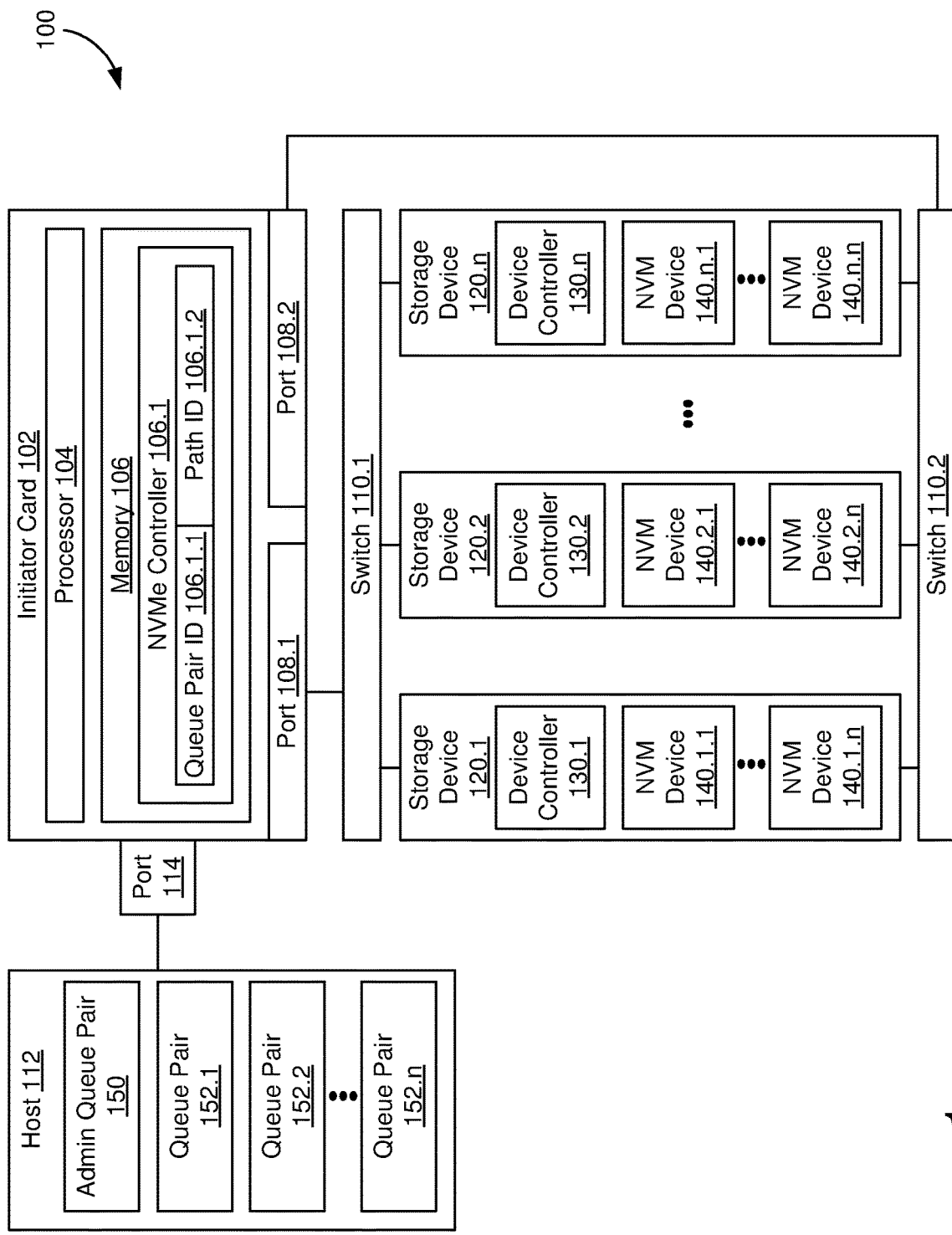
FIG. 1 schematically illustrates a multi-device storage system supporting at least one host system through a storage interface initiator card.

FIG. 1 shows an embodiment of an example data storage system 100 with multiple data storage devices 120 supporting at least one host system 112 through storage interface initiator card 102. While some example features are illustrated, various other features have not been illustrated for the sake of brevity and so as not to obscure pertinent aspects of the example embodiments disclosed herein. To that end, as a non-limiting example, data storage system 100 may include one or more multi-ported data storage devices 120 (also sometimes called information storage devices, storage devices, disk drives, or drives) configured in a storage node with initiator card 102. In some embodiments, storage devices 120 may be configured in a server, storage array blade, all flash array appliance, or similar storage unit for use in data center storage racks or chassis. Storage devices 120 may interface with one or more host nodes or host systems 112 and provide data storage and retrieval capabilities for or through those host systems. In some embodiments, storage devices 120 may be configured in a storage hierarchy that includes storage nodes, storage controllers, and/or other intermediate components between storage devices 120 and host systems 112. For example, each initiator card 102 may provide a storage interface connection for a corresponding set of multi-port storage devices 120 in a storage node and their respective storage devices may be connected through a corresponding backplane network and/or internal bus architecture that provides multiple backend paths including one path through switch 110.1 and another path through switch 110.2. In some embodiments, at least some storage controller functions may be included within initiator card 102 for connecting storage devices 120 through a fabric network for communication with host system 112.

In the embodiment shown, a number of storage devices 120 are attached to a common storage interface bus for host communication through switches 110 and initiator card 102. Storage device 120 may include multi-port drives providing multiple physical ports for host communication with the drive and supporting multiple backend data paths from initiator card 102. For example, storage devices 120 may be dual port drives including two physically separate interface ports supporting peripheral component interface express (PCIe) and/or ethernet physical, transport, and application protocols. In some configurations, initiator card 102 provides a storage interface initiator function to two physically separate backend non-volatile memory express (NVMe) connections. These separate connections may be provided through separate backplane networks or bus configurations that use switches 110 to route data traffic from ports 108 to corresponding host interface ports on storage devices 120. For example, port 108.1 may connect initiator card 102 through switch 110.1 to a first host interface port on each storage device 120 and port 108.2 may connect initiator card 102 through switch 110.2 to a second host interface port on each storage device 120. The plurality of physical storage device port connections on each storage device 120 may define physical, transport, and other logical channels for establishing communication with the different components and subcomponents for establishing a communication channel to host 112. Different ports and backend channels may be configured for different physical interface connections and interface protocols, but support a common storage interface protocol. For example, PCIe and ethernet ports may support respective physical, transport, and interface standards, while enabling NVMe over fabric (NVMeOF) communication over those interface channels. In some configurations, both port 108.1 and port 108.2 may be ethernet ports connecting to parallel network backplanes and corresponding switches 110.

In some embodiments, data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with ports 108 through switches 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called central processing units (CPUs), processors, microprocessors, or microcontrollers) configured to execute instructions in one or more programs. In some embodiments, the one or more processors are shared by one or more components within, and in some cases, beyond the function of the device controllers. In some embodiments, device controllers 130 may include firmware for controlling data written to and read from media devices 140, one or more storage (or host) interface protocols for communication with other components, as well as various internal functions, such as garbage collection, wear leveling, media scans, and other memory and data maintenance. For example, device controllers 130 may include firmware for running the NVM layer of an NVMe storage protocol alongside media device interface and management functions specific to the storage device. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, initiator card 102 may be coupled to data storage devices 120 and/or host 112 through network interfaces that are part of a host fabric network and includes initiator card 102 as a host fabric interface. In some embodiments, host system 112 may be coupled to data storage system 100 through fabric network and initiator card 102 may be capable of supporting communications with multiple host systems 112. The fabric network may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks. From the perspective of storage devices 120, switches 110 and/or initiator card 102 may be referred to as a host interface bus and provides a host data path between storage devices 120 and host system 112, through initiator card 102.

Host system 112 may be any suitable computer device, such as a computer, a computer server, a laptop computer, a tablet device, a netbook, an internet kiosk, a personal digital assistant, a mobile phone, a smart phone, a gaming device, or any other computing device. Host system 112 is sometimes called a host, host device, host node, client, or client system. In some embodiments, host system 112 is a server system, such as a server system in a data center. In some embodiments, host system 112 is physically distinct from a storage node housing the plurality of storage devices 120 and/or initiator card 102. In some embodiments, host system 112 may be one of a plurality of host systems owned, operated, and/or hosting applications belonging to a plurality of entities and supporting one or more quality of service (QOS) standards for those entities and their applications. Host system 112 may be configured to store and access data in the plurality of storage devices 120 in a multi-tenant configuration with shared storage resource pools. For example, host queue pairs (comprised of paired submission queues and completion queues) may be dynamically mapped to backend queue pairs using logical host connections to enable access to namespaces allocated in NVM devices 140 of storage devices 120. In some configurations, host system 112 may include at least one administrative queue pair 150 configured for host communication regarding storage device management and configuration and a number of storage queue pairs 152.1-152.n for dynamic host connections to storage devices 120 and the namespaces they contain. For example, a host storage interface may support 16 storage queue pairs 152 (n=16) in addition to administrative queue pair 150.

Initiator card 102 may include one or more central processing units (CPUs) or processors 104 for executing compute operations, storage management operations, and/or instructions for accessing storage devices 120 through switches 110. For example, initiator card 102 may instantiate a storage interface controller, such as an NVMe controller 106.1, to provide a single connection path for host 112 through port 114. In some configurations, host port 114 may be configured as a PCIe port for direct connection to host 112 through a PCIe bus. In some embodiments, processors 104 may include a plurality of processor cores which may be assigned or allocated to parallel processing tasks and/or processing threads for different storage operations and/or host storage connections. In some embodiments, processor 104 may be configured to execute fabric interface for communications through the fabric network and/or storage interface protocols for communication through switch ports 108 and switches 110 as multiple physically and logically distinct backend paths to storage devices 120. In some configurations, a separate network interface unit and/or storage interface unit (not shown) may provide the network interface protocol and/or storage interface protocol and related processor and memory resources.

Initiator card 102 may include a memory 106 configured to support the processing functions of processor 104. For example, memory 106 may instantiate NVMe controller 106.1 for managing a plurality of queue pairs identifiers 106.1.1 allocated between host system 112 and storage devices 120. In some embodiments, initiator card 102 may provide a storage interface controller instance that acts as a single port (e.g., port 114) interface for host system 112 to access the multipath backend configuration for communication with storage devices 120. For example, NVMe controller 106.1 may use queue pair identifiers 106.1.1 to dynamically allocate backend host connections among multiple backend paths using path identifiers 106.1.2 and a corresponding queue pair manager layer. By mapping queue pair identifiers 106.1.1 to backend path identifiers 106.1.2 in NVMe controller 106.1, host system 112 may manage namespace host connections as single path connections, while NVMe controller 106.1 and the queue pair manager manage multipath policy and host connections to storage devices 120 in compliance with NVMe standards. In some embodiments, memory 106 may include one or more dynamic random access memory (DRAM) devices for use by storage devices 120 for command, management parameter, and/or host data storage and transfer. In some embodiments, storage devices 120 may be configured for direct memory access (DMA), such as using remote direct memory access (RDMA) protocols through initiator card 102.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
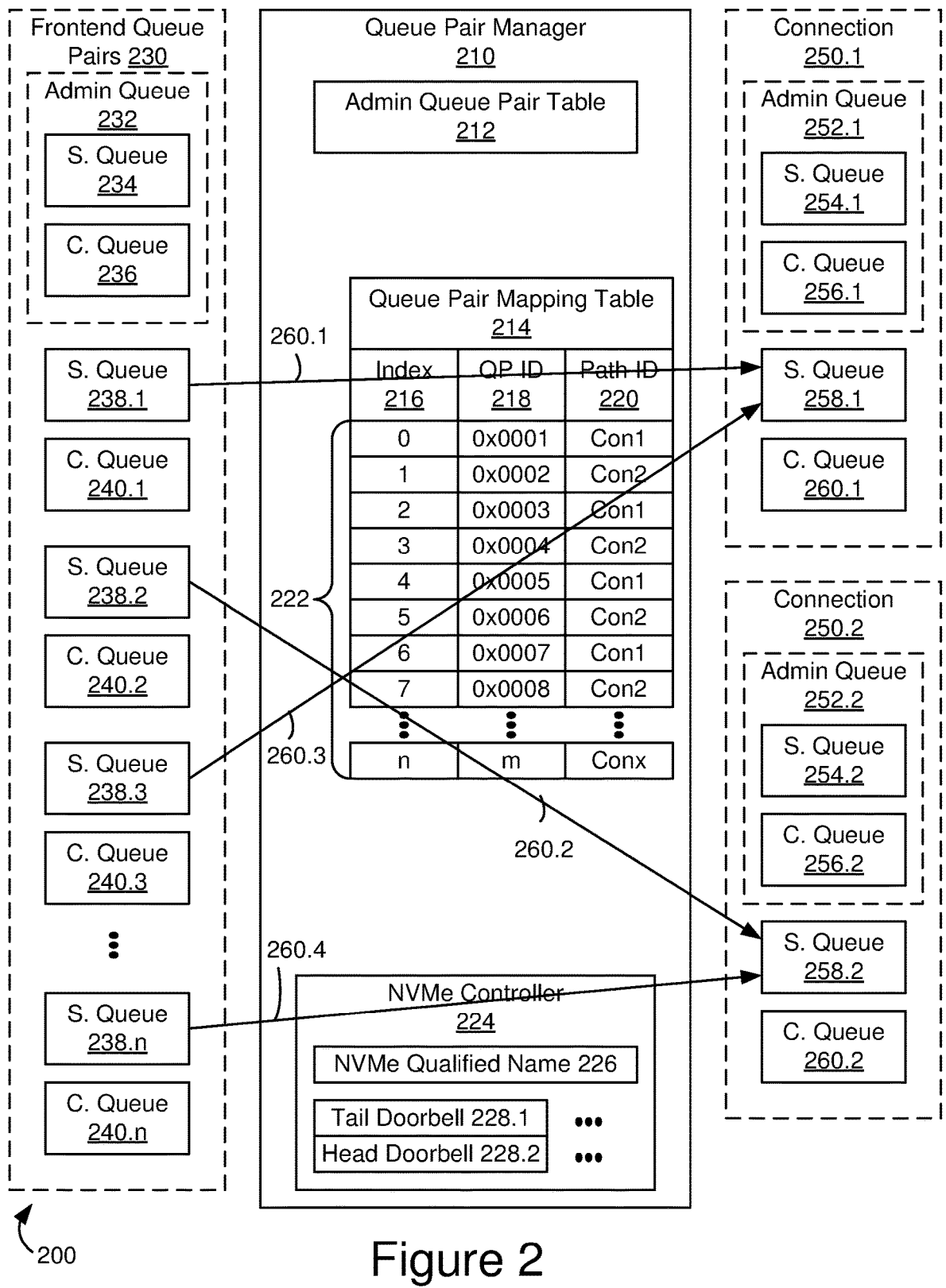
FIG. 2 schematically illustrates a multipath architecture using a queue pair manager in an initiator, such as the storage interface initiator card of FIG. 1.

FIG. 2 shows schematic representations of a multipath architecture in a storage system 200 using a queue pair manager 210 in an initiator, such as the storage interface initiator card of FIG. 1. Queue pair manager 210 may use queue pair mapping tables 212 and 214 to allow an NVM controller instance configured for single port communication with a host system to manage multipath backend connections to the data storage devices. Frontend queue pairs 230 may correspond to the host queue pairs assigned to specific host connections and target namespaces by the host system. Connections 250 may correspond to duplicate sets of backend queue pairs associated with physically and logically separate backend paths for reaching the same storage device queue pair. The resulting namespace identifiers (namespace universal identifier (NS-UID) or namespace global universal identifier (NGUID)) may be the same throughout the host connection path. Queue pair manager 210 may instantiate or interface with an NVMe controller 224 instance to provide a single controller identifier to the host system while associating different controller identifiers with connection 240.1 and connection 240.2 for communication with the storage devices.

This architecture may offload the multipathing capability to the initiator card and expose a single storage interface controller and set of namespaces (from the multipath storage devices) to the host operating system. The operating system of the host may treat the controller and namespaces as if the storage device was locally attached and be unaware that the data storage devices may be remote and configured with redundant paths. For example, the host system may see multiple queue pairs to communicate with the initiator card as a PCIe device supporting NVMe storage commands to a set of namespaces having corresponding namespace identifiers. When the initiator card receives submission queue entries (SQE) (e.g., host storage commands) directed to a particular frontend queue pair, queue pair manager 210 may forward the SQE to a backend queue pair using NVMeoF to reach the target data storage device. Selection of the backend queue pair may be determined from a queue pair identifier associated with the frontend queue pair and mapped to a backend queue pair by queue pair mapping table 214.

Queue pair manager 210 may include logic instantiated in the initiator card for managing the forwarding of host commands (e.g., SQEs) from frontend queue pairs to backend queue pairs and command responses (e.g., completion queue entries (CQEs)) from backend queue pairs to frontend queue. In some configurations, queue pair manager 210 may include an administrative queue pair table 212 or similar data structure for determining queue pair mapping for handling administrative commands to the data storage devices. For example, a set of frontend administrative queue pairs 232 may be mapped to backend administrative queue pairs 252 for either connection 250. Similar to other queue pairs, administrative queue pairs 232, 252 may include submission queues 234, 254 and completion queues 236, 256. In some configurations, admin queue pair table 212 may be configured similarly to queue pair mapping table 214 to include administrative mapping entries for each active administrative connection. The mapping of frontend administrative queue pairs 232 to backend administrative queue pairs 252 may be dynamically generated for each administrative connection and/or administrative SQE to distribute the administrative load between connections 250 using a least used path algorithm.

Queue pair mapping table 214 may include a table or similar data structure for mapping unique queue pair identifiers corresponding to frontend host connections to backend path identifiers for selecting between available backend connections 250. For example, queue pair mapping table 214 may include an index field 216, a queue pair identifier field 218, and a path identifier field 220 for each frontend queue pair. A series of mapping entries 222 may map each queue pair identifier to a current path identifier for the connection to be used. Each entry may also include an index value for organizing and indexing the table. In the example shown, mapping entries 222 may include mapping entries for index values from 1-*n* corresponding to frontend queue pair identifiers 0x0001-m and the mapped path identifiers, such as Con1 for connection 250.1 and Con2 for connection 250.2. These entries may correspond to frontend storage queue pairs on a one-to-one basis for each queue pair, such as submission queue 238.1 and completion queue 240.1, submission queue 238.2 and completion queue 240.2, submission queue 238.3 and completion queue 240.3, and so on to submission queue 238.*n* and completion queue 240.*n*.

Queue pair manager 210 may use a multipath policy for determining and assigning path identifiers 220. For example, a round robin policy may alternate the connections selected for each queue pair identifier and corresponding mapping entry in queue pair mapping table 214, such that alternating entries have different connections. In the example shown, even index values may be assigned to Con1 and odd index values may be assigned to Con2. Other multipath policies may use randomized distribution or more complex load balancing algorithms, such as least used path algorithms. Multipath policies may also define operating periods and/or trigger conditions for changing the configuration of path identifier assignments. Queue pair manager 210 may also include a failover policy that uses queue pair mapping table 214 for managing the failure of one of the connections and moving backend connections to the operating path. Failover may be further described below, particularly with regard to FIGS. 6*a* and 6*b*.

Queue pair manager 210 may include or interface with an NVMe controller 224 that is exposed to the host system through a host interface port and provides a single NVMe controller path from the host system to the initiator card. For example, the NVMe controller may include an NVMe qualified name (NQN) 226 used for addressing NVMe messages to the initiator card and, thereby, the data storage devices connected through the backend connection paths. Each host connection and corresponding commands (e.g., SQEs or CQEs) may be addressed using NQN 226 and NVMe controller 224 may include the sets of submission queue tail doorbells 228.1 and completion queue head doorbells 228.2 for interacting with frontend queue pairs 230.

In the example shown, two connections 250.1, 250.2 are shown corresponding to two backend connection paths through physically and logically distinct network or bus connections to multiport data storage devices. For example, connection 250.1 may connect through a first switch and corresponding storage interface or network bus to a first port on each data storage device and connection 250.1 may connect through a second switch and corresponding storage interface or network bus to a second port on each data storage device. In some configurations, each connection 250 may correspond to a separate NVMe-oF connection to each data storage device. Each connection 250 may include an administrative queue pair 252 and a storage queue pair including submission queue 258 and completion queue 260. While only one storage queue pair is shown, any number of backend queue pairs may be used for managing backend connections to the data storage devices through the two connection paths. In some configurations, queue pair manager 210 may map frontend queue pairs to backend queue pairs on a one-to-one or one-to-many basis.

Figure 3:
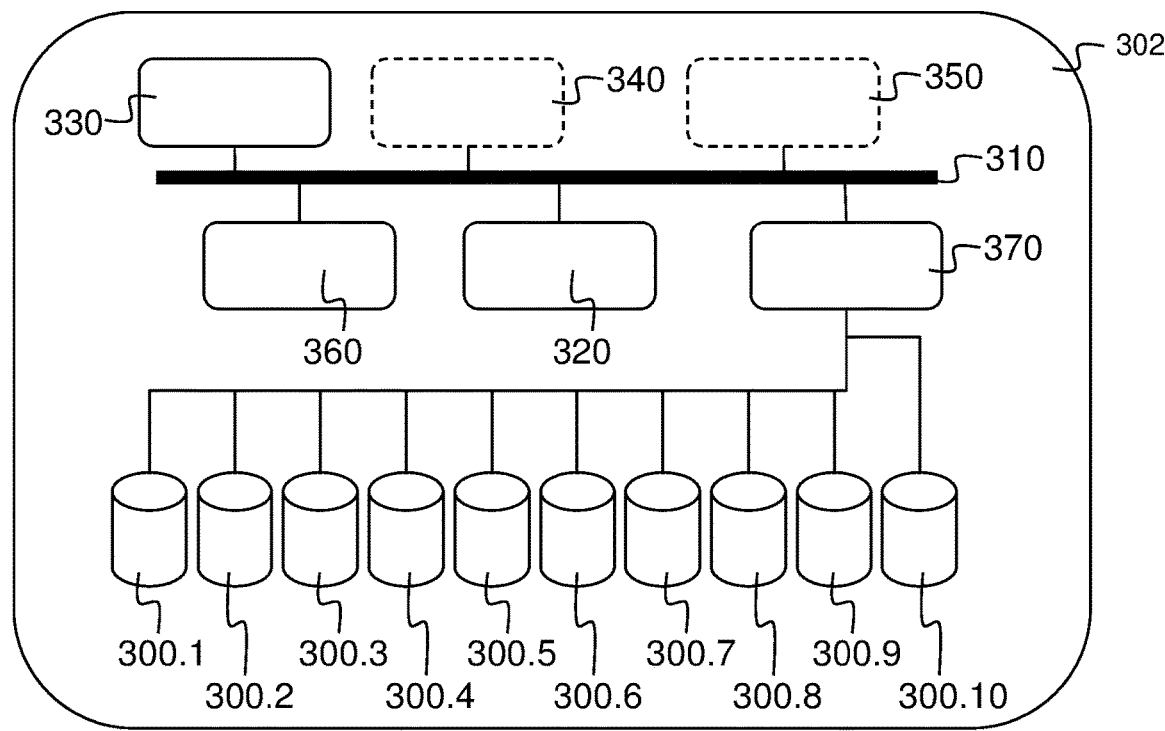
FIG. 3 schematically illustrates a storage node of the multi-device storage system of FIG. 1.

FIG. 3 shows a schematic representation of a storage node 302. For example, initiator card 102 may be configured as a storage node 302 for accessing storage devices 120 as storage elements 300. Storage node 302 may comprise a bus 310, a storage node processor 320, a storage node memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller, backplane management controller, network interface controller, or host bus interface controller. Bus 310 may include one or more conductors that permit communication among the components of storage node 302. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 302, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 302 to communicate with other devices and/or systems, for example mechanisms for communicating with other storage nodes 302 or host systems 112. Storage element interface 370 may comprise a storage interface, such as a Serial Advanced Technology Attachment (SATA) interface, a Small Computer System Interface (SCSI), peripheral computer interface express (PCIe), network interface, etc., for connecting bus 310 to one or more storage elements 300, such as one or more storage devices 120, for example, 2 terabyte (TB) SATA-II disk drives or 2 TB NVMe solid state drives (SSDs), and control the reading and writing of data to/from these storage elements 300. As shown in FIG. 3, such a storage node 302 could comprise ten 2 TB SATA-II disk drives as storage elements 300.1-300.10 and in this way storage node 302 would provide a storage capacity of 20 TB to the storage system 100. As described above, storage node 302 may be configured with multiport storage elements 300 and support multiple storage element interfaces 370 to provide redundant paths for accessing data stored to storage elements 300.

Figure 4:
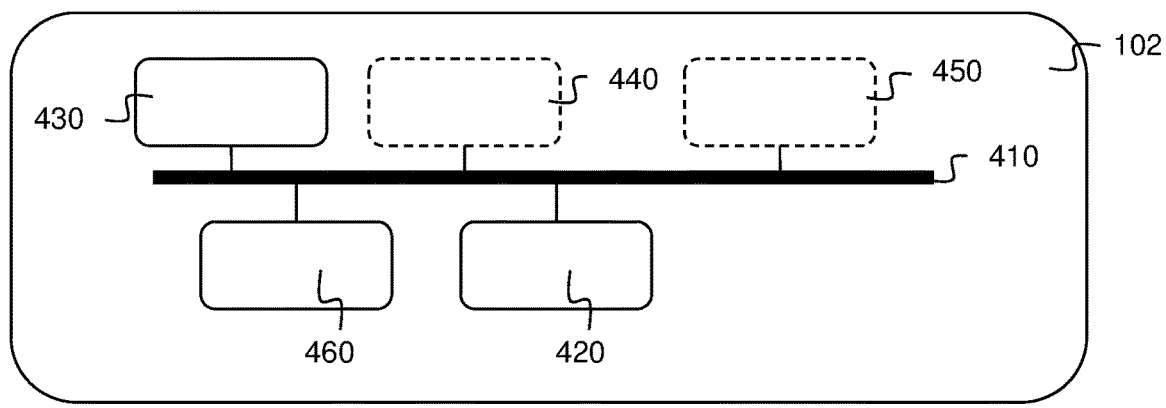
FIG. 4 schematically illustrates a host node of the multi-device storage system of FIG. 1.

FIG. 4 shows a schematic representation of an example host system 112. Host system 112 may comprise a bus 410, a processor 420, a local memory 430, one or more optional input units 440, one or more optional output units 450, and a communication interface 460. Bus 410 may include one or more conductors that permit communication among the components of host 112. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to host 112 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 112 to communicate with other devices and/or systems.

Figure 5:
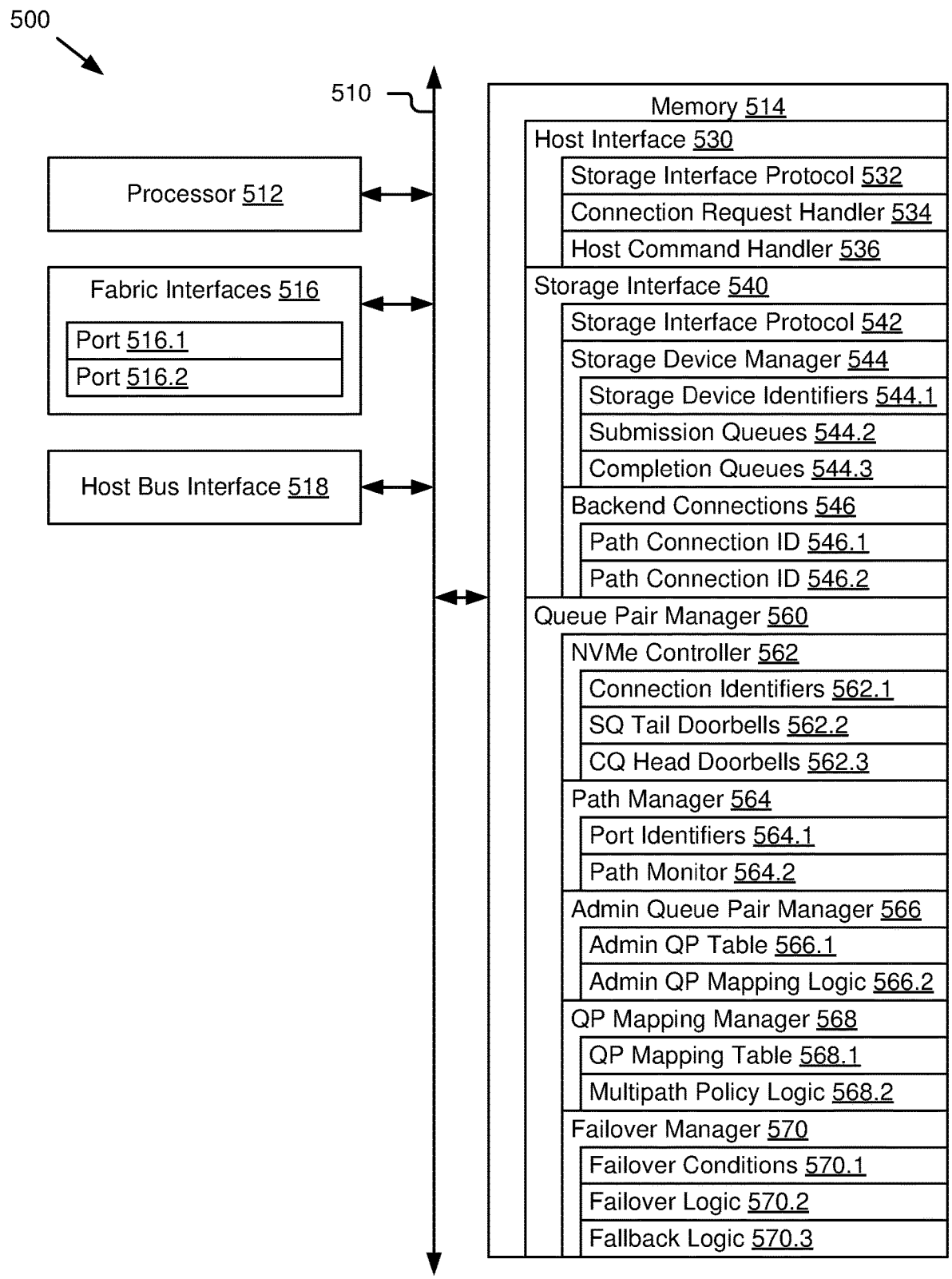
FIG. 5 schematically illustrates some elements of the storage interface initiator card of FIG. 1-2 in more detail.

FIG. 5 schematically shows selected modules of a storage interface initiator 500 configured for providing a multipath backend through a single path frontend using NVMe protocols. Initiator 500 may incorporate elements and configurations similar to those shown in FIGS. 1-2. For example, initiator 500 may be configured as initiator card 102 connected through parallel fabric interfaces 516 to a plurality of multiport storage devices 120 supporting host connection requests and storage operations from host system 112.

Initiator 500 may include a bus 510 interconnecting at least one processor 512, at least one memory 514, and at least one interface, such as fabric interfaces 516 and host interface 518. Bus 510 may include one or more conductors that permit communication among the components of initiator 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Fabric interface 516 may include multiple physical interfaces for connecting to one or more data storage devices using an interface protocol that supports storage device access. For example, fabric interfaces 516 may include a PCIe or similar storage interface connector and/or an ethernet or similar network interface connector supporting NVMe access to solid state media in a set of connected data storage devices. In some configurations, fabric interface 516 may include and support a plurality of physical ports 516.1, 516.2 corresponding to physically and logically distinct backend connection paths. For example, each port 516.1, 516.2 may connect to separate storage or network buses and corresponding switches for directing messages to corresponding ports on each multiport data storage device. Host bus interface 518 may include a physical interface for connecting to one or more host nodes, generally via a storage bus interface, such as PCIe or a network interface. For example, host bus interface 518 may include an ethernet connection to a host bus adapter, network interface, or similar network interface connector and/or a PCIe or similar storage interface connector supporting NVMe host connection protocols, such as RDMA and transfer control protocol/internet protocol (TCP/IP) connections.

Initiator 500 may include a plurality of modules or subsystems that are stored and/or instantiated in memory 514 for execution by processor 512 as instructions or operations. For example, memory 514 may include a host interface 530 configured to receive, process, and respond to host connection and data requests from client or host systems. Memory 514 may include a storage interface 540 configured to manage forwarding storage commands to backend data storage devices. Memory 514 may include a queue pair manager 560 configured provide the connection indirection layer between the single path host frontend and the multipath storage device backend.

Host interface 530 may include an interface protocol and/or set of functions and parameters for receiving, parsing, responding to, and otherwise managing requests from host nodes or systems. For example, host interface 530 may include functions for receiving and processing host requests for establishing host connections with one or more namespaces in the storage devices for reading, writing, modifying, or otherwise manipulating data blocks and their respective client or host data and/or metadata in accordance with host communication and storage protocols. In some embodiments, host interface 530 may enable direct memory access and/or access over NVMe protocols, such as RDMA and TCP/IP access, through host bus interface 518 and fabric interfaces 518 to host data units stored in the data storage devices. For example, host interface 530 may include host communication protocols compatible with ethernet, PCIe, and/or another host interface that supports use of NVMe and/or RDMA protocols for data access to host data. Host interface 530 may further include host communication protocols compatible with accessing storage node and/or host node resources, such memory buffers, processor cores, queue pairs, and/or specialized assistance for computational tasks. In some configurations, one or more functions of host interface 530 may be instantiated in or interact with NVMe controller 562 in queue pair manager 560.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over host bus interface 518 and/or fabric interface 516. For example, host interface 530 may include a connection request handler 534 configured to receive and respond to host connection requests. For example, host interface 530 may include a host command handler 536 configured to receive host storage commands to a particular host connection. In some embodiments, host interface 530 may include additional modules (not shown) for command handling, buffer management, storage device administration and reporting, and other host-side functions.

In some embodiments, storage interface protocol 532 may include both PCIe and NVMe compliant communication, command, and syntax functions, procedures, and data structures. In some embodiments, storage interface protocol 532 may include an NVMeoF or similar protocol supporting RDMA, TCP/IP, and/or other connections for communication between host nodes and target host data in the data storage devices, such as volumes or namespaces mapped to the particular host. Storage interface protocol 532 may include interface definitions for receiving host connection requests and storage commands from the fabric network, as well as for providing responses to those requests and commands. In some embodiments, storage interface protocol 532 may assure that host interface 530 is compliant with host request, command, and response syntax while the backend of host interface 530 may be configured to interface with queue pair manager 560 to provide mapping between the host requests and the storage devices.

Connection request handler 534 may include interfaces, functions, parameters, and/or data structures for receiving host connection requests in accordance with storage interface protocol 532, determining an available processing queue, such as a queue-pair, allocating the host connection (and corresponding host connection identifier) to a storage device processing queue, and providing a response to the host, such as confirmation of the host storage connection or an error reporting that no processing queues are available. For example, connection request handler 534 may receive a storage connection request for a target namespace in a NVMe-oF storage array and provide an appropriate namespace storage connection and host response. Once a host connection for a frontend queue pair is established, connection request handler 534 may interact with queue pair manager 560 to add the host queue pair to the queue pair identifiers and queue pair mapping for backend path management.

Host command handler 536 may include interfaces, functions, parameters, and/or data structures to handle storage requests directed to the host storage connections allocated through connection request handler 534. For example, once a host storage connection for a given namespace and host connection identifier is allocated to a backend connection path, the host may send any number of storage commands targeting data stored in that namespace. In some configurations, host command handler 536 may be instantiated in or interface with NVMe controller 562 to provide submission queue and completion queue doorbells for receiving host storage commands and completion responses. Host storage commands, such as SQEs and CQEs, may be received by host command handler 536 and forwarded to storage interface 540 according to the mapping provided by queue pair manager 560.

Storage interface 540 may include an interface protocol and/or set of functions and parameters for passing host storage commands for reading, writing, and deleting data units in corresponding backend storage devices to those storage devices. Storage interface 540 may also support host administrative commands through backend queue pairs. Storage interface 540 may support multiple backend path connection to each data storage device. For example, storage interface 540 may instantiate separate backend connections corresponding to port 516.1 and port 516.2. Queue pair manager 560 may determine a mapping from frontend queue pairs to backend queue pairs and manage the forwarding of host storage commands to the target backend connection.

In some embodiments, storage interface 540 may include a plurality of hardware and/or software modules configured to use processor 512 and memory 514 to handle or manage defined operations of storage interface 540. For example, storage interface 540 may include a storage interface protocol 542 configured to comply with the physical, transport, and storage application protocols supported by the storage devices for communication over fabric interfaces 516, similar to or part of storage interface protocol 532. For example, storage interface 540 may include a storage device manager 544 configured to manage communications with the storage devices in compliance with storage interface protocol 542. For example, storage interface 540 may include backend connections 546 configured to instantiate separate backend connection paths corresponding to multipath connections to the storage devices, such as separate backend storage paths to the same storage device and namespaces through port 516.1 and port 516.2.

In some embodiments, storage interface protocol 542 may include PCIe, ethernet, and NVMe compliant communication, command, and syntax functions, procedures, and data structures. In some embodiments, storage interface protocol 542 may include an NVMeoF or similar protocol supporting RDMA, TCP/IP, and/or other connections for communication between host nodes and target host data in the data storage devices, such as volumes or namespaces mapped to the particular host. Storage interface protocol 532 may include interface definitions for directing storage commands through the fabric network, as well as for providing responses to those requests and commands. In some embodiments, storage interface protocol 532 may assure that storage interface 540 is compliant with host request, command, and response syntax for host storage commands forwarded by queue pair manager 560.

Storage device manager 544 may include interfaces, functions, parameters, and/or data structures to manage how host storage commands are sent to corresponding processing queues in the storage devices and responses are returned for the hosts. In some embodiments, storage device manager 544 may manage a plurality of storage devices, such as an array of storage devices in a storage node. For example, storage device manager 544 may be configured for a storage array of eight SSDs, each SSD having a unique storage device identifier 544.1 and configuration. Storage device manager 544 may be configured to manage any number of storage devices. In some embodiments, storage device manager 544 may include a data structure containing storage device identifiers 544.1 and configuration information for each storage device, such as port and/or other addressing information, device type, capacity, number of supported queue-pairs, input/output (I/O) queue depth, etc. Storage device manager 544 may support one or more queue pairs including submission queues 544.2 and completion queues 544.3 associated with each data storage device. For example, each data storage device may support one or more queue pairs dynamically mapped to one or more namespaces allocated within the non-volatile memory of that data storage device. In some configurations, submission queues 544.2 and completion queues 544.3 may include at least on administrative queue pair configured for host administrative commands, rather than host storage commands.

Backend connections 546 may include interfaces, functions, parameters, and/or data structures to manage separate connection paths for multiport data storage devices. For example, the backend storage bus and/or network bus may be configured for physically and logically independent backend paths electrically connecting port 516.1 to one port on each storage device and connecting port 516.2 to another port on each storage device. In some configurations, backend connections 546 may instantiate NVMe path connections for each backend connection. Each path connection may instantiate a separate backend connection with different connection identifiers and parallel structures of submission queues 544.2 and completion queues 544.3. For example, path connection identifier 546.1 may correspond to a backend connection through port 516.1 and path connection identifier 546.2 may correspond to a backend connection through port 516.2. The different connection identifiers may allow the NVMe protocols on the data storage devices to validate the multipath connections and manage communication through the respective paths and ports.

Queue pair manager 560 may include interface protocols and a set of functions, parameters, and data structures for providing mapping between host interface 530 and storage interface 540 to enable NVMe protocols for single path communication to be used on the host side and multipath communication to be used on the storage side. For example, queue pair manager 560 may receive host storage commands, determine which backend connections 546 to use for those storage commands, and forward the storage commands to the corresponding queue pairs at the selected backend connection. In some embodiments, queue pair manager 560 may include NVMe controller 562, path manager 564, administrative queue pair manager 566, queue pair mapping manager 568, and failover manager 570.

NVMe controller 562 may include interfaces, functions, parameters, and/or data structures configured to receive host connections and host storage commands. For example, NVMe controller 562 may operate in conjunction with and/or instantiate at least portions of host interface 530 to provide a single path interface to one or more host systems. NVMe controller 562 may be configured to receive host connection identifiers 562.1 for managing a plurality of host connections to one or more namespaces in the storage devices and identifying the host queue pairs corresponding to those host connections. For example, NVMe controller 562 may include an NVMe qualified name (NON) used for addressing NVMe messages to initiator 500 and, thereby, the data storage devices connected through the backend connection paths. Each host connection and corresponding commands (e.g., SQEs or CQEs) may be addressed using the NON and host connection identifiers 562.1. In some configurations, NVM controller 562 may include the sets of submission queue tail doorbells 562.2 and completion queue head doorbells 262.3 for interacting with frontend queue pairs. For example, submission queue tail doorbells 562.2 may allow the host system to add host storage commands through SQEs to the submission queues and completion queue head doorbells 562.3 may allow the host system to receive and remove completion response messages from the completion queues.

Path manager 564 may include interfaces, functions, parameters, and/or data structures configured to manage access to the backend paths through backend connections 546. For example, path manager 564 may identify backend connections 546 for routing forwarded messages to the target path. In some configurations, path manager 564 may use port identifiers 564.1 to denote the backend paths and corresponding backend connections 546. For example, path manager 564 may associate one backend path identifier with port 516.1 and corresponding path connection identifier 546.1 and another backend path identifier with port 516.2 and corresponding path connection identifier 546.2. In some configurations, path manager 564 may also include a path monitor 564.2 configured to determine path metrics and/or failure conditions for each backend path. For example, path monitor 564.2 may use storage message traffic and/or pings to the backend storage devices to measure throughput, latency, and similar connection metrics for each backend connection path. Backend path connection metrics may be provided to admin queue pair manager 566 and/or queue pair mapping manager 568 for use in evaluating multipath mapping and/or policy logic. Based on collected metrics, error conditions, and/or failure of storage devices on a path to respond, path monitor 564.2 may determine path failure conditions. For example, path monitor 564.2 may include a counter that uses elapsed time without response and/or error count compared to a failure threshold and, if that failure threshold is met, a failure condition notification may be provided to failover manager 570.

Administrative queue pair manager 566 may include interfaces, functions, parameters, and/or data structures configured to manage the mapping of administrative queue pairs from host interface 530 to storage interface 540. For example, administrative queue pair manager 566 may include an administrative queue pair table 566.1 that includes mapping entries for frontend administrative queue pair identifiers to backend path connection identifiers. In some configurations, administrative queue pair manager 566 may include administrative queue pair mapping logic 566.2 that operates independent of multipath policy logic 568.2 for storage queue pair mapping. For example, administrative queue pair mapping logic 566.2 may be based on a different multipath policy, such as using a least used path algorithm to dynamically select the backend path to use for each host administrative command and/or operating period for a set of host administrative commands. In some configurations, administrative queue pair manager 566 may use entries in queue pair mapping table 566.1 rather than maintaining a separate data structure for administrative queue pairs.

Queue pair mapping manager 568 may include interfaces, functions, parameters, and/or data structures configured to manage handling the mapping of storage queue pairs from host interface 530 to storage interface 540. For example, queue pair mapping manager 568 may include a queue pair mapping table 568.1 configured similar to queue pair mapping table 214 in FIG. 2. In some configurations, queue pair mapping manager 568 may include multipath policy logic 568.2 configured to execute a selected multipath policy for determining the backend connection paths to be used for host storage commands during any given operating period. For example, multipath policy logic 568.2 may be configured with a round robin policy that evenly distributes queue pair connections among the available backend connections 546. In an architecture having two parallel backend connections, the round robin policy may result in alternating path connection identifiers between sequential host queue pair mapping entries in queue pair mapping table 568.1, such as even entries being mapped to path connection identifier 546.1 and odd entries being mapped to path connection identifier 546.2. A round robin policy may be implemented on a more dynamic basis based on use of each queue pair and adjusting backend connection mapping to distribute use (and load balancing) of the backend connections by reallocating alternating backend mapping for active queue pairs during any given operating period. Multipath policy logic 568.2 may be configured with other multipath policies, such as random distribution of queue pairs to backend connections or using a least used path algorithm to allocate or reallocate mapping. In some configurations, multipath policy and corresponding multipath policy logic 568.2 may be a user configurable feature allowing a system administrator to set one or more configuration parameters, such as in a configuration page of initiator 500, to determine the multipath policy to be used.

Failover manager 570 may include interfaces, functions, parameters, and/or data structures configured to monitor for failover conditions 570.1 to force remapping of backend connections 546 in administrative queue pair mapping table 566.1 and/or storage queue pair mapping table 568.1. For example, failover manager 570 may receive backend connection failure conditions from path monitor 564.2 and compare them against a set of failover conditions 570.1 for triggering a failover state and moving all backend connection to an operating path connection identifier. In some configurations, failover conditions 570.1 may include logical rules for determining, based on failure conditions of backend connections 546, whether to initiate a failover condition and trigger failover logic 570.2. Failover logic 570.2 may include logical rules for evaluating operating backend connections and, once a target operating backend connection is determined, remapping queue pairs previously mapped to the failed backend connection to an operating backend connection. An example of this logic is further explained with regard to FIGS. 6a and 6b. Fallback logic 570.3 may include logical rules for evaluating when a failover condition ends and redistributing backend connections 546 among the host queue pair identifiers. For example, path monitor 564.2 may determine that a previously failed backend connection has returned to an operating state and notify failover manager 570 of the end of the failure condition. Responsive to the end of the failure condition, fallback logic 570.3 may trigger queue pair mapping manager 568 to redistribute queue pairs across backend connections 546 based on multipath policy logic 568.2.

Figure 6A:
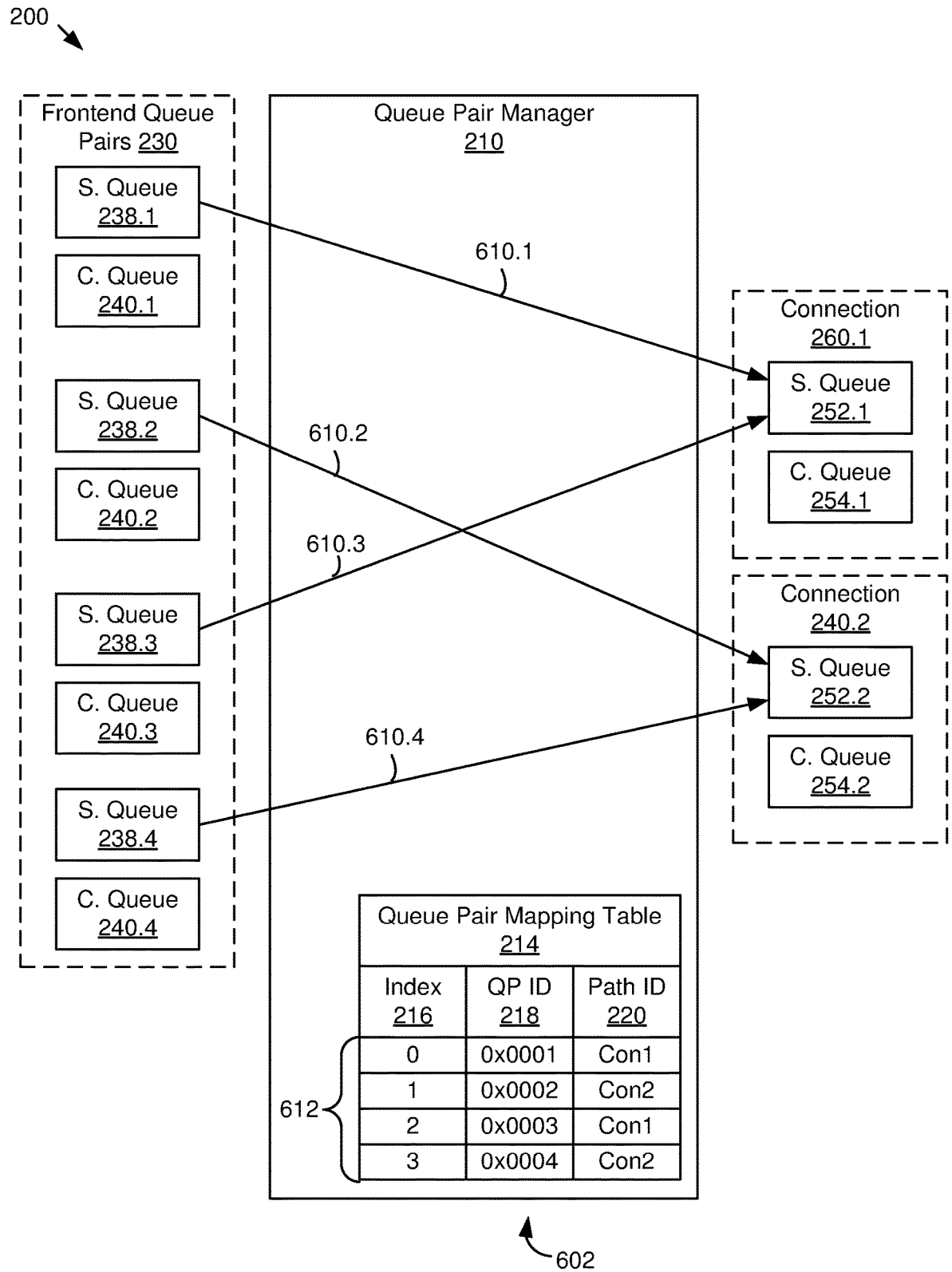
FIG. 6a schematically illustrates the multipath architecture of FIG. 2 prior to a failover event.

As shown in FIG. 6a, storage system 200 may be operated in a first configuration 602 where frontend queue pairs 238.1, 240.1, 238.2, 240.2, 238.3, 240.3, and 238.4, 240.4 are mapped to connection 260.1 or connection 260.2 prior to a failover condition. For example, submission queues 238.1 and 238.3 may each be mapped to backend submission queue 252.1 for connection 260.1 and submission queues 238.2 and 238.4 may each be mapped to backend submission queue 252.2 for connection 260.2. Host storage commands 610.1, 610.2, 610.3, and 610.4 may be forwarded by queue pair manager 210 based on queue pair mapping table 214 and path identifier fields 220 in mapping entries 612.

Figure 6B:
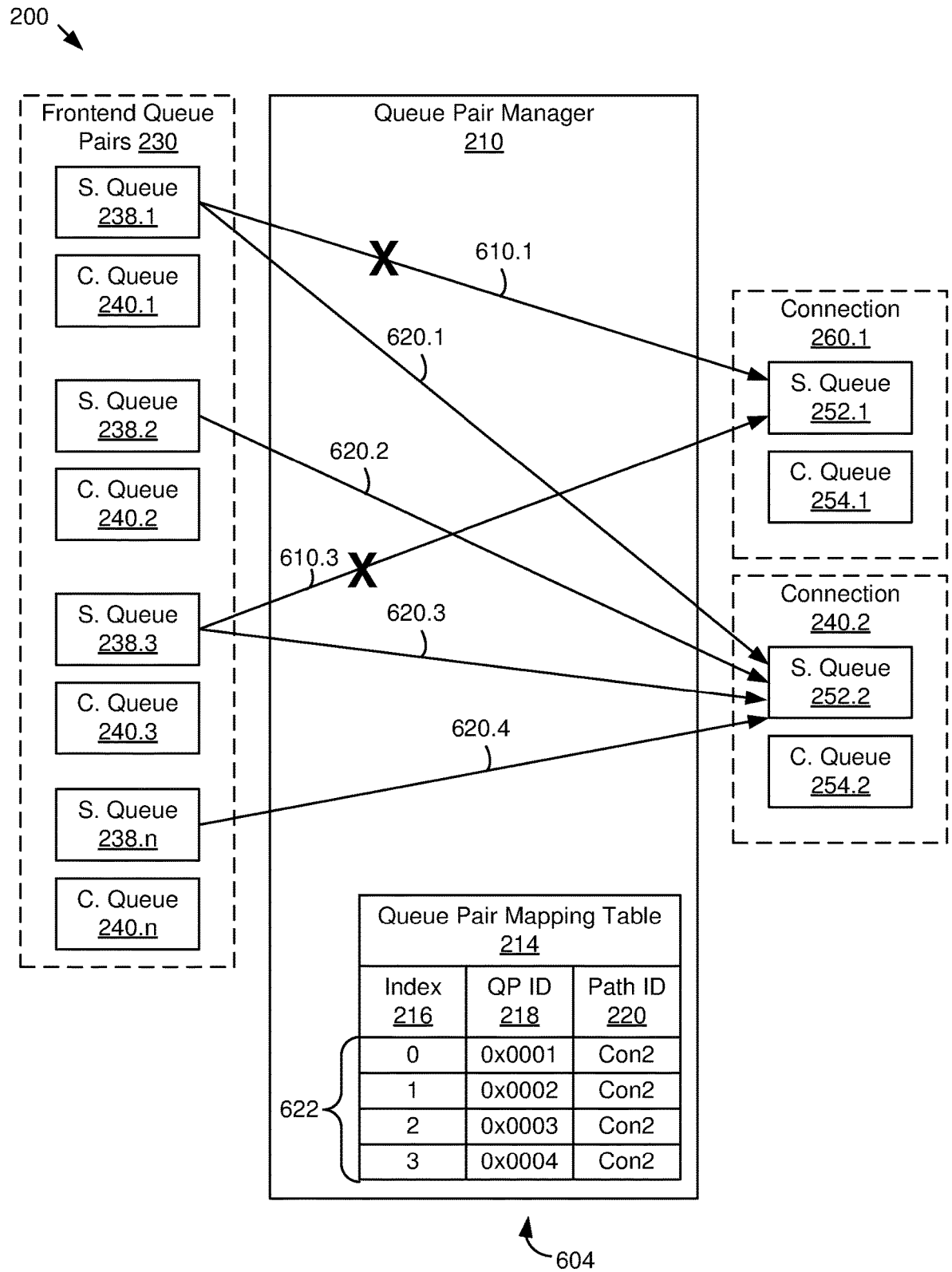
FIG. 6b schematically illustrates the multipath architecture of FIG. 2 after a failover event.

As shown in FIG. 6b, storage system 200 may be operated in a second configuration 604 where frontend queue pairs 238.1, 240.1, 238.2, 240.2, 238.3, 240.3, and 238.4, 240.4 are each mapped to connection 260.2 during a failover condition. For example, responsive to a failure condition of connection 260.1, failover logic may determine that prior storage commands 610.1 and 610.3 have not been processed due to the failure condition of connection 260.1 and may remap queue pairs those queue pairs to connection 240.2. As a result, submission queues 238.1 and 238.3 may be mapped to connection 240.2 during the failover operating period. During the failover operating period, host storage commands 620.1, 620.2, 620.3, and 620.4 may be forwarded by queue pair manager 210 based on queue pair mapping table 214 and path identifier fields 220 in updated mapping entries 622. In some configurations, failover logic may identify host storage commands 610.1 and 610.3 that were not successfully forwarded through submission queue 252.1 and resubmit them through the failover connection to submission queue 252.2. Upon the failover condition ending, fallback logic may return to first configuration 602, redistributing the backend connections among the backend connections.

Figure 7:
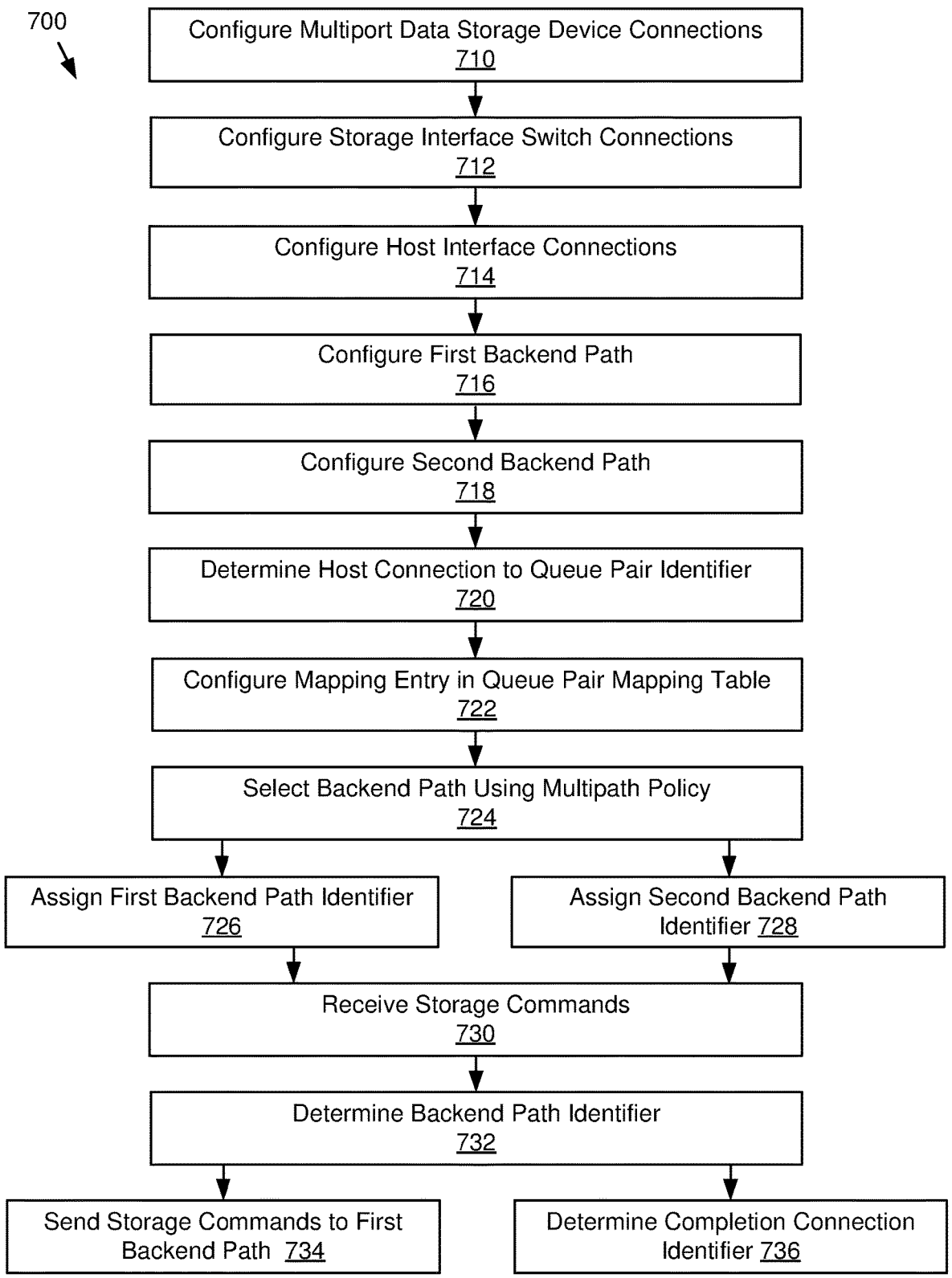
FIG. 7 is a flowchart of an example method of managing multipath connections to data storage devices based on queue pair identifiers.

As shown in FIG. 7, initiator 500 may be operated according to an example method for managing multipath connections to data storage devices based on queue pair identifiers, i.e., according to method 700 illustrated by blocks 710-736 in FIG. 7.

At block 710, multiport data storage device connections may be configured. For example, data storage devices with two host interface ports compatible with NVMe-oF communication may be plugged into separate storage and/or network interface buses that connect to corresponding ports on initiator 500.

At block 712, storage interface switches may be configured. For example, each bus may connect to a corresponding switch configured for connecting each initiator port to a plurality of data storage device ports.

At block 714, host interface connection may be configured. For example, the host interface port of the initiator port may be connected to a PCIe or network interface bus to enable single path communication with one or more host systems.

At block 716, a first backend path may be configured. For example, the initiator may determine a first backend path for NVMe-oF connections to the storage devices through the first initiator port and corresponding switch and storage device ports and assign it path connection identifier and corresponding storage interface configuration.

At block 718, a second backend path may be configured. For example, the initiator may determine a second backend path for NVMe-oF connections to the storage devices through the second initiator port and corresponding switch and storage device ports and assign it different path connection identifier and corresponding storage interface configuration.

At block 720, host connections to frontend queue pairs may be determined. For example, the initiator may receive connection requests from the host system for host connections to specific namespaces in the data storage devices and determine corresponding host connection identifiers and queue pair identifiers.

At block 722, mapping entries may be configured in the queue pair mapping table. For example, for each host connection and queue pair identifier, the initiator may add a mapping entry to the queue pair mapping table for the queue pair identifier.

At block 724, a backend path may be selected using a multipath policy. For example, the initiator may apply multipath policy logic to determine a backend path assignment for each frontend queue pair identifier.

At block 726, a first backend path identifier may be assigned. For example, the initiator may select, for a portion of the queue pair identifiers, the first backend path at block 724, determine a corresponding backend path connection identifier, and write it to the corresponding mapping entry in the queue pair mapping table.

At block 728, a second backend path identifier may be assigned. For example, the initiator may select, for a different portion of the queue pair identifiers, the second backend path at block 724, determine a corresponding backend path connection identifier, and write it to the corresponding mapping entry in the queue pair mapping table.

At block 730, storage commands may be received. For example, the initiator may receive host storage commands as submission queue entries directed to particular host connections and queue pair identifiers in the frontend of the initiator.

At block 732, a backend path identifier may be determined. For example, the initiator may lookup the backend connection identifier for the queue pair identifier in the queue pair mapping table.

At block 734, storage commands may be sent to the first backend path. For example, the initiator may forward host storage commands with the first backend connection identifier to a backend queue pair corresponding to the first backend connection for the target data storage device.

At block 736, storage commands may be sent to the second backend path. For example, the initiator may forward host storage commands with the second backend connection identifier to a backend queue pair corresponding to the second backend connection for the target data storage device.

Figure 8A:
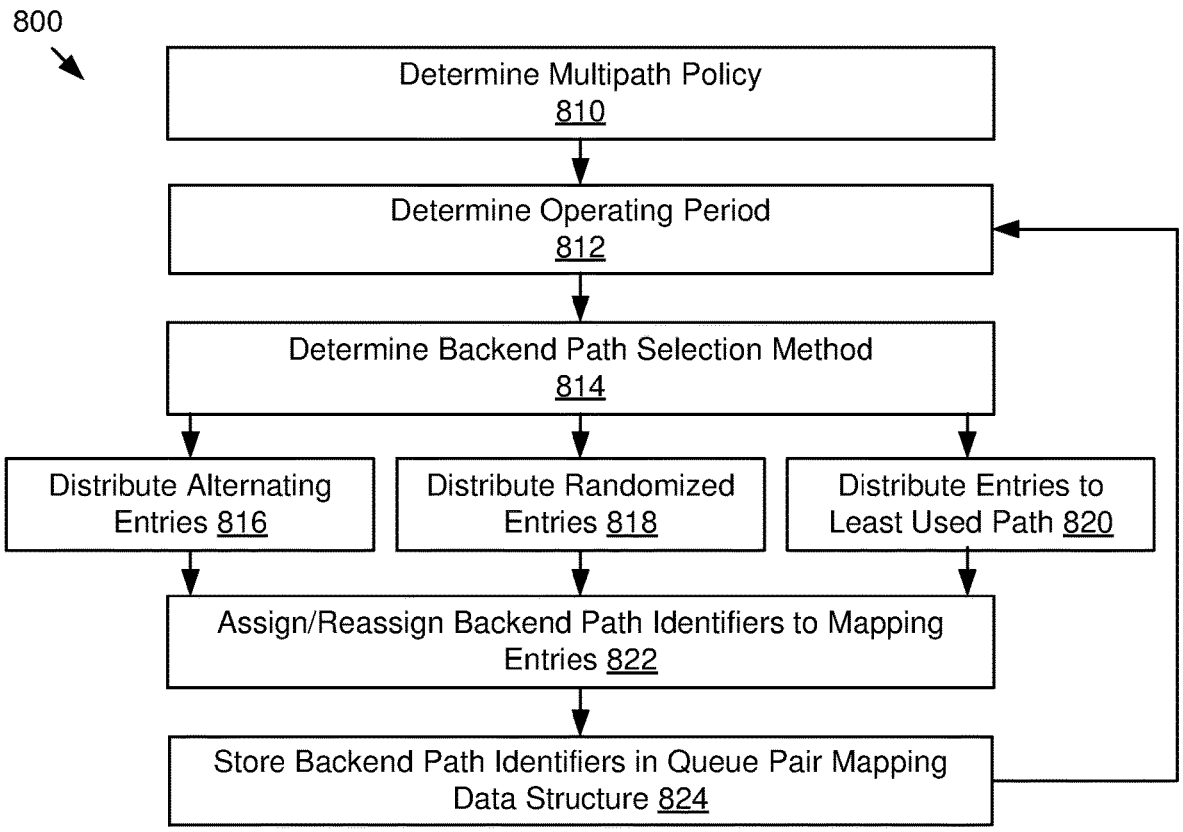
FIG. 8a is a flowchart of an example method of using multipath policies for host storage connections.

As shown in FIG. 8a, initiator 500 may be operated according to an example method for using multipath policies for host storage connections, i.e., according to method 800 illustrated by blocks 810-824 in FIG. 8a.

At block 810, a multipath policy may be determined. For example, the initiator may be configured with a multipath policy for distributing host connections and corresponding host storage commands among the backend connections to the data storage devices.

At block 812, an operating period may be determined. For example, the multipath policy may define operating periods and/or operating conditions for changing the configuration of the backend connections.

At block 814, a backend path selection method may be determined. For example, the multipath policy may define the backend path selection method to be used for each host connection and corresponding queue pair identifier.

At block 816, backend paths may be distributed to alternating mapping entries. For example, the initiator may determine a round robin policy with two backend paths and alternate the selected path connection identifier for adjacent entries in the sequence of entries.

At block 818, backend paths may be distributed to random mapping entries. For example, the initiator may determine a random policy with each queue pair identifier and corresponding mapping entry randomly assigned between the two path connection identifiers.

At block 820, backend paths may be distributed mapping entries based on least used paths. For example, for each operating period, the initiator may use a least used path algorithm to allocate more or less of the queue pair identifiers to each backend connection based on which backend path was used less in the prior operating period.

At block 822, the backend path identifiers may be assigned or reassigned to host connection mapping entries. For example, based on the backend path selections from blocks 814-820, the initiator may assign the backend path identifiers to each mapping entry in the queue pair mapping table.

At block 824, backend path identifiers may be stored in the queue pair mapping data structure. For example, the initiator may store the backend path identifiers assigned at block 822 by writing them to the path identifier field in each mapping entry in the queue pair mapping table as a backend path configuration. Operation may return to block 812 to change the path configuration for a next operating period.

Figure 8B:
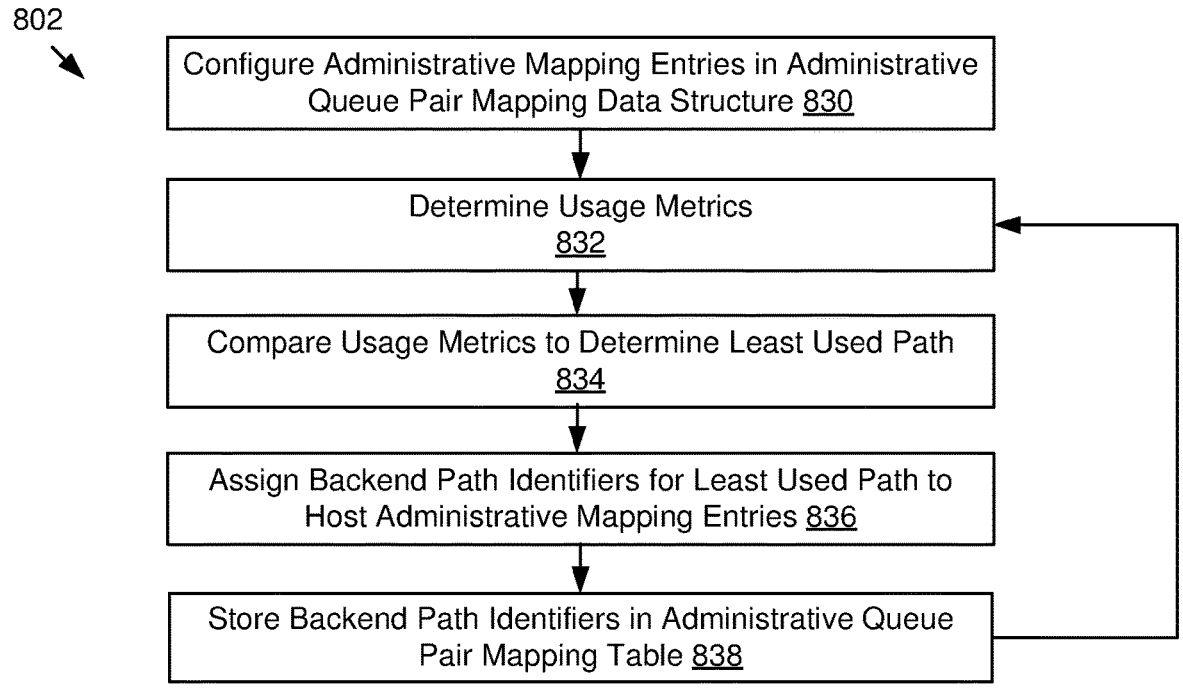
FIG. 8b is a flowchart of an example method of using multipath policies for host administrative connections.

As shown in FIG. 8b, initiator 500 may be operated according to an example method for using multipath policies for host administrative connections, i.e., according to method 802 illustrated by blocks 830-838 in FIG. 8b.

At block 830, administrative mapping entries may be configured in an administrative queue pair mapping data structure. For example, the initiator may include an administrative queue pair mapping table and/or include administrative queue pair mapping entries in the queue pair mapping table used for storage connections.

At block 832, usage metrics may be determined. For example, the initiator may determine usage metrics for the backend paths and/or namespace connections.

At block 834, usage metrics may be compared to determine least used paths. For example, the initiator may compare the usage metrics for the different paths and/or namespace connections to determine the least used paths for administrative commands.

At block 836, backend path identifiers for least used paths may be assigned to host administrative mapping entries. For example, the initiator may assign backend path identifiers to administrative queue pair mapping entries based on the least used paths determined at block 834.

At block 838, backend path identifiers may be stored in the administrative queue pair mapping data structure. For example, the initiator may store the backend path identifiers assigned at block 836 by writing them to the path identifier field in each mapping entry in the administrative queue pair mapping table.

Figure 9:
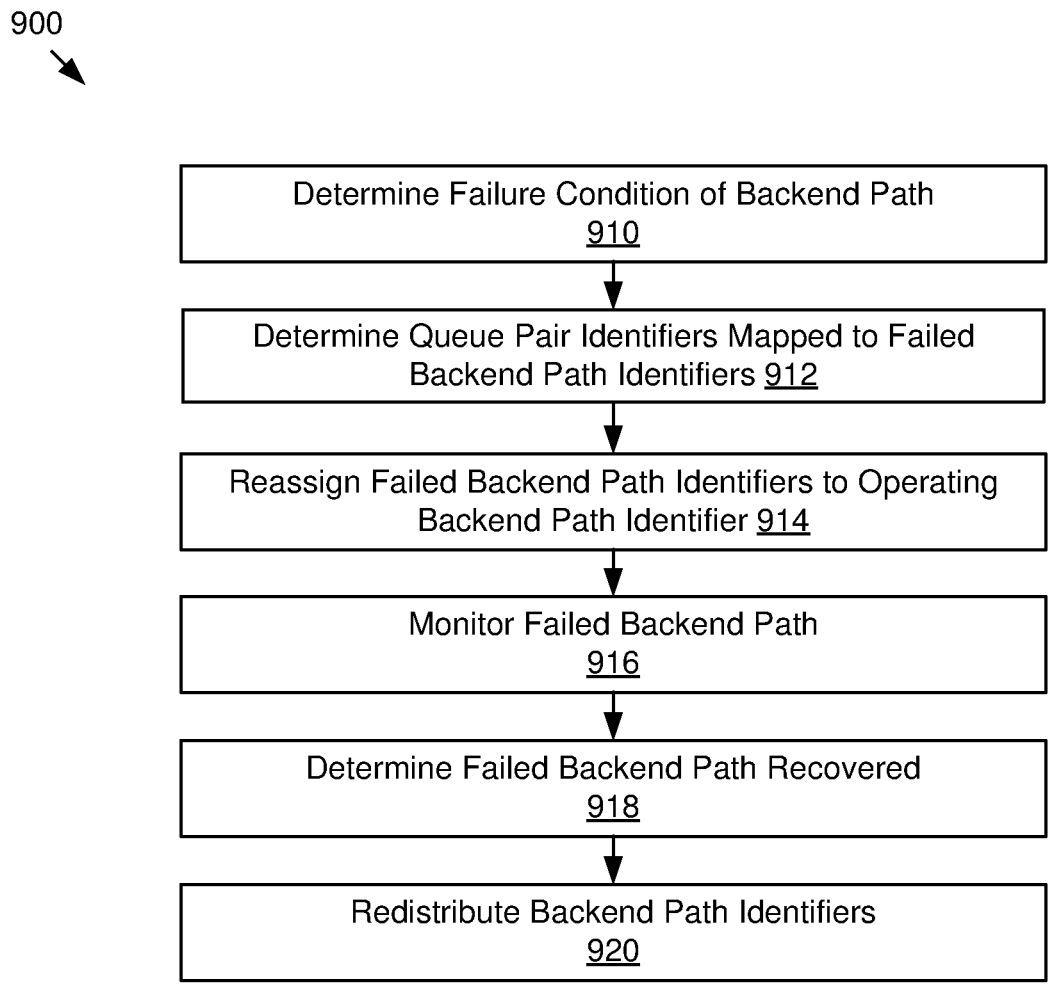
FIG. 9 is a flowchart of an example method of managing failover for multipath data storage devices.

As shown in FIG. 9, initiator 500 may be operated according to an example method for managing failover for multipath data storage devices, i.e., according to method 900 illustrated by blocks 910-920 in FIG. 9.

At block 910, a failure condition of a backend path may be determined. For example, the initiator may determine that one of the backend paths is no longer operating to send storage commands to the data storage devices.

At block 912, queue pair identifiers mapped to failed backend path identifiers may be determined. For example, the initiator may use the backend path identifier corresponding to the failed backend path to identify the queue pair identifiers currently mapped to the failed backend path.

At block 914, failed backend path identifiers may be reassigned to operating backend path identifiers. For example, the initiator may update the mapping entries for the queue pair identifiers identified at block 912 with the backend path identifier for the backend path that is still operating.

At block 916, the failed backend path may be monitored. For example, the initiator may monitor the failed backend path to determine whether and when it becomes operational again.

At block 918, the failed backend path may be determined to be recovered. For example, the initiator may determine that messages through the previously failed backend path are no reaching the data storage devices.

At block 920, backend path identifiers may be redistributed. For example, the initiator may return the queue pair mapping table to its prior configuration with both backend path identifiers and/or use the multipath policy to redistribute queue pair identifiers among the operational backend paths.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:
1. A system, comprising:
    an initiator card comprising:
        at least one processor;
        at least one memory;
        a storage interface configured to communicate with a plurality of data storage devices, wherein the storage interface comprises:

a first switch port configured for a first backend path through a first switch to a first storage device port of each data storage device of the plurality of data storage devices; and a second switch port configured for a second backend path through a second switch to a second storage device port of each data storage device of the plurality of data storage devices;

a host interface comprising a host port configured to communicate with at least one host device; and an interface controller configured to:
  determine, for a first storage connection request from a host device, a first queue pair identifier assigned to a target data storage device in the plurality of data storage devices;
  determine, for a first storage command to the first queue pair identifier, a first path identifier for a first selected backend path selected from:
    the first backend path; and
    the second backend path; and
  send the first storage command to the target data storage device through the first selected backend path.

2. The system of claim 1, wherein:
the interface controller is further configured to:
  determine, for a second storage command to the first queue pair identifier, a second path identifier for a second selected backend path selected from:
    the first backend path; and
    the second backend path; and
  send the second storage command to the target data storage device through the second selected backend path;
the first selected backend path is the first backend path; and
the second selected backend path is the second backend path.

3. The system of claim 1, wherein:
the interface controller comprises a queue pair mapping data structure comprised of a plurality of mapping entries;
each mapping entry of the plurality of mapping entries comprises:
  a queue pair identifier for a corresponding host connection to the plurality of data storage devices; and
  a backend path identifier for that corresponding host connection;
the plurality of mapping entries include includes a first mapping entry for the first queue pair identifier; and
the backend path identifiers are selected from:
  a first backend path identifier for the first backend path; and
  a second backend path identifier for the second backend path.

4. The system of claim 3, wherein:
the interface controller is further configured to:
  assign, during a first operating period, the backend path identifier for each mapping entry of the plurality of mapping entries in a first path configuration; and
  reassign, during a second operating period, the backend path identifier for each mapping entry of the plurality of mapping entries in a second path configuration;
a first portion of the plurality of mapping entries is configured to receive the first backend path identifier during the first operating period;

a second portion of the plurality of mapping entries is configured to receive the first backend path identifier during the second operating period; and
the first portion and the second portion are different sets of the plurality of mapping entries.

5. The system of claim 3, wherein:
the interface controller is further configured to assign, based on a multipath policy, the backend path identifier for each mapping entry of the plurality of mapping entries;
a first portion of the plurality of mapping entries is configured to receive the first backend path identifier; and
a second portion of the plurality of mapping entries is configured to receive the second backend path identifier.

6. The system of claim 5, wherein the multipath policy is configured to distribute the first portion of the plurality of mapping entries alternating with the second portion of the plurality of mapping entries.

7. The system of claim 5, wherein the multipath policy is configured to distribute the first portion of the plurality of mapping entries randomly among the second portion of the plurality of mapping entries.

8. The system of claim 3, wherein the interface controller is further configured to:
  determine a failure condition for the first backend path; and
  reassign, responsive to the failure condition, the backend path identifier for each mapping entry with the first backend path identifier to the second backend path identifier.

9. The system of claim 1, wherein:
the interface controller comprises an administrative queue pair mapping data structure comprised of a plurality of administrative mapping entries;
each administrative mapping entry of the plurality of administrative mapping entries comprises:
  a queue pair identifier for a corresponding host administrative connection to the plurality of data storage devices; and
  a backend path identifier for that corresponding host administrative connection;
the backend path identifiers are selected from:
  a first backend path identifier for the first backend path; and
  a second backend path identifier for the second backend path; and
the interface controller is further configured to:
  determine usage metrics for the first backend path and the second backend path;
  compare the usage metrics of the first backend path and the second backend path to determine which backend path is a least used path; and
  assign, responsive to determination of the least used path, the backend path identifier for at least one administrative mapping entry to the backend path identifier for the least used path.

10. The system of claim 1, further comprising:
the plurality of data storage devices, wherein each data storage device of the plurality of data storage devices comprises:
  a non-volatile storage medium;
  the first storage device port configured for connection to the first backend path; and
  the second storage device port configured for connection to the second backend path;

the first switch configured for the first backend path between the first switch port and the first storage device ports of the plurality of data storage devices; and the second switch configured for the second backend path between the second switch port and the second storage device ports of the plurality of data storage devices.

11. A computer-implemented method, comprising:

configuring, from a storage interface initiator, a first backend path to a first storage device port of each data storage device of a plurality of data storage devices;

configuring, from the storage interface initiator, a second backend path to a second storage device port of each data storage device of the plurality of data storage devices;

configuring a plurality of mapping entries in a queue pair mapping data structure, wherein:
  each mapping entry of the plurality of mapping entries comprises:
    a queue pair identifier for a corresponding host connection to the plurality of data storage devices; and
    a backend path identifier for that corresponding host connection;
  the plurality of mapping entries includes a first mapping entry for a first queue pair identifier; and
  the backend path identifiers are selected from:
    a first backend path identifier for the first backend path; and
    a second backend path identifier for the second backend path;

determining, for a first storage connection request from a host device, the first queue pair identifier assigned to a target data storage device in the plurality of data storage devices;

determining, for a first storage command to the first queue pair identifier, a first path identifier for a first selected backend path selected from:
  the first backend path; and
  the second backend path; and sending the first storage command to the target data storage device through the first selected backend path.

12. The computer-implemented method of claim 11, further comprising:

determining, for a second storage command to the first queue pair identifier, a second path identifier for a second selected backend path selected from:
  the first backend path; and
  the second backend path; and sending the second storage command to the target data storage device through the second selected backend path, wherein:
  the first selected backend path is the first backend path; and
  the second selected backend path is the second backend path.

13. The computer-implemented method of claim 11, further comprising:

determining, based on the host connection corresponding to the first storage command, the first queue pair identifier, wherein determining the first path identifier comprises:
  using the first queue pair identifier to lookup the first mapping entry; and
  determining the first path identifier from the backend path identifier in the first mapping entry.

14. The computer-implemented method of claim 11, further comprising:

assigning, during a first operating period, the backend path identifier for each mapping entry of the plurality of mapping entries in a first path configuration; and reassigning, during a second operating period, the backend path identifier for each mapping entry of the plurality of mapping entries in a second path configuration, wherein:
  a first portion of the plurality of mapping entries receives the first backend path identifier during the first operating period;
  a second portion of the plurality of mapping entries receives the first backend path identifier during the second operating period; and
  the first portion and the second portion are different sets of the plurality of mapping entries.

15. The computer-implemented method of claim 11, further comprising:

assigning, based on a multipath policy, the backend path identifier for each mapping entry of the plurality of mapping entries, wherein:
  a first portion of the plurality of mapping entries receives the first backend path identifier; and
  a second portion of the plurality of mapping entries receives the second backend path identifier.

16. The computer-implemented method of claim 15, further comprising:

distributing, based on the multipath policy, the first portion of the plurality of mapping entries alternating with the second portion of the plurality of mapping entries.

17. The computer-implemented method of claim 15, further comprising:

distributing, based on the multipath policy, the first portion of the plurality of mapping entries randomly among the second portion of the plurality of mapping entries.

18. The computer-implemented method of claim 11, further comprising:

determining a failure condition for the first backend path; and reassigning, responsive to the failure condition, the backend path identifier for each mapping entry with the first backend path identifier to the second backend path identifier.

19. The computer-implemented method of claim 11, further comprising:

configuring a plurality of administrative mapping entries in an administrative queue pair mapping data structure, wherein:
  each administrative mapping entry of the plurality of administrative mapping entries comprises:
    a queue pair identifier for a corresponding host administrative connection to the plurality of data storage devices; and
    a backend path identifier for that corresponding host administrative connection; and
  the backend path identifiers are selected from:
    a first backend path identifier for the first backend path;
    a second backend path identifier for the second backend path; and determining usage metrics for the first backend path and the second backend path;

comparing the usage metrics of the first backend path and the second backend path to determine which backend path is a least used path; and assigning, responsive to determination of the least used path, the backend path identifier for at least one administrative mapping entry to the backend path identifier for the least used path.

20. A storage system comprising:
at least one processor;
at least one memory;
a host interface configured to communicate with at least one host device;
a plurality of data storage devices;
a storage interface configured to communicate with the plurality of data storage devices,
wherein the storage interface comprises:
a first backend path to a first storage device port of each data storage device of the plurality of data storage devices; and
a second backend path to a second storage device port of each data storage device of the plurality of data storage devices;
means for configuring a plurality of administrative mapping entries in an administrative queue pair mapping data structure, wherein:
each administrative mapping entry of the plurality of administrative mapping entries comprises:
a queue pair identifier for a corresponding host administrative connection to the plurality of data storage devices; and
a backend path identifier for that corresponding host administrative connection; and
the backend path identifiers are selected from:
a first backend path identifier for the first backend path; and
a second backend path identifier for the second backend path;
means for determining usage metrics for the first backend path and the second backend path;
means for comparing the usage metrics of the first backend path and the second backend path to determine which backend path is a least used path;
means for assigning, responsive to determination of the least used path, the backend path identifier for at least one administrative mapping entry to the backend path identifier for the least used path;
means for determining, for a first storage connection request from a host device, a first queue pair identifier assigned to a target data storage device in the plurality of data storage devices;
means for determining, for a first storage command to the first queue pair identifier, a first path identifier for a first selected backend path selected from:
the first backend path; and
the second backend path; and
means for sending the first storage command to the target data storage device through the first selected backend path.

* * * * *